US009837913B1

(12) United States Patent
Xiong

(10) Patent No.: US 9,837,913 B1
(45) Date of Patent: Dec. 5, 2017

(54) CONTROL METHOD TO AVOID CAPACITIVE MODE SWITCHING FOR RESONANT CONVERTERS

(71) Applicant: Universal Lighting Technologies, Inc., Madison, AL (US)

(72) Inventor: Wei Xiong, Madison, AL (US)

(73) Assignee: UNIVERSAL LIGHTING TECHNOLOGIES, INC., Madison, AL (US)

(*) Notice: Subject to any disclaimer, the term of this patent is extended or adjusted under 35 U.S.C. 154(b) by 0 days.

(21) Appl. No.: 15/425,195

(22) Filed: Feb. 6, 2017

Related U.S. Application Data

(60) Provisional application No. 62/325,143, filed on Apr. 20, 2016.

(51) Int. Cl.
H05B 37/02 (2006.01)
H02M 3/335 (2006.01)
H02M 3/08 (2006.01)
H02M 1/42 (2007.01)
H05B 33/08 (2006.01)
H02M 1/00 (2006.01)

(52) U.S. Cl.
CPC ..... *H02M 3/33507* (2013.01); *H02M 1/4241* (2013.01); *H02M 3/08* (2013.01); *H05B 33/0815* (2013.01); *H05B 33/0845* (2013.01); *H05B 33/0851* (2013.01); *H05B 33/0887* (2013.01); *H02M 2001/0009* (2013.01)

(58) Field of Classification Search
CPC ............ H05B 33/0815; H05B 33/0845; H05B 33/0851; H05B 33/0887
USPC ........................................ 315/224, 274, 307
See application file for complete search history.

(56) References Cited

U.S. PATENT DOCUMENTS

| 5,696,431 A | 12/1997 | Giannopoulos et al. |
| 9,112,415 B2 | 8/2015 | Grakist et al. |
| 9,237,613 B1 | 1/2016 | Xiong et al. |
| 2013/0271021 A1* | 10/2013 | Elferich ............... H02M 1/4258 315/206 |
| 2014/0091720 A1* | 4/2014 | Brinlee ............... H05B 33/0815 315/186 |

(Continued)

*Primary Examiner* — Tung X Le
(74) *Attorney, Agent, or Firm* — Patterson Intellectual Property Law, P.C.; Mark J. Patterson; Gary L. Montle

(57) ABSTRACT

A resonant power converter is provided with capacitive switching mode protection. The converter produces output current and voltage according to an operating frequency, which is desirably maintained above a resonant frequency for the power converter. A controller regulates the operating frequency based on an output current relative to a reference value, which may be provided via a dimming interface. A capacitive switching mode is determinable, based on a positive relationship in a detected direction of change in an output value relative to a detected direction of change in the operating frequency. When the capacitive switching mode is determined, a preceding operating frequency is enacted and the controller disables regulation of the operating frequency therefrom. Inductive mode switching is determinable with a negative relationship between detected direction of change in the output value relative to direction of change in the operating frequency, wherein regulation of operating frequency is renewed.

16 Claims, 4 Drawing Sheets

(56) References Cited

U.S. PATENT DOCUMENTS

| | | | |
|---|---|---|---|
| 2015/0257222 A1* | 9/2015 | Siessegger | H05B 33/0809 315/186 |
| 2016/0014858 A1* | 1/2016 | Ramabhadran | H05B 33/0815 315/186 |
| 2016/0073457 A1* | 3/2016 | Nakajo | H05B 33/0815 315/223 |
| 2016/0190945 A1 | 6/2016 | Liu et al. | |

* cited by examiner

US 9,837,913 B1

CONTROL METHOD TO AVOID CAPACITIVE MODE SWITCHING FOR RESONANT CONVERTERS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/325,143, filed Apr. 20, 2016, and which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to resonant type DC-DC converters. More particularly, the present invention relates to resonant type DC-DC power converters implemented in LED drivers and having capacitive mode protection circuitry and programming.

Referring to FIG. 1, an exemplary constant power LED driver 100 as conventionally known in the art may often implement a resonant type DC-DC converter 102 because of its relatively high efficiency and variable gain. An output current from the DC-DC converter 102 passes through a load RL, such as an LED array coupled across output terminals for the driver. A current sensor 106 such as a current sensing resistor R6 feeds back the output current information to a controller 104, which is configured to control the output current to a reference current set point defined by input signal I_ref. The controller accomplishes this is many cases by regulating the driven frequency of switching elements in the DC-DC converter via control signals CTRL to maintain the target current set by the reference current I_ref.

The relatively high efficiency of DC-DC resonant type converters 102 is provided at least in part via soft switching, or zero-voltage switching (ZVS), of the associated switching elements. As used herein, the term ZVS refers to on/off transitions for respective switching elements only during a time period when there is no voltage across them.

However, one notable problem with such implementations as described above is that if the operating frequency is too low, the DC-DC resonant converter could enter into reverse-recovery switching, or capacitive mode switching, that instantly damages associated circuitry. The operating frequency of the DC-DC converter switches must be higher than the associated resonant frequency to maintain inductive switching (i.e., soft-switching).

As illustrated in FIG. 2, the gain of the converter output changes in relation to the operating frequency. For example, a first output voltage curve Vout_1 and a first output current curve Iout_1 are demonstrated as a function of frequency in association with a high load impedance. A second output voltage curve Vout_2 and a second output current curve Iout_2 are demonstrated as a function of frequency in association with a low load impedance. A resonant frequency of the DC-DC converter tank for the high output impedance load, f_res1, is higher than the resonant frequency of the tank, f_res2, for the lower output impedance load. The steady state frequency f_op1 for the high load is greater than the resonant frequency f_res1, and the steady state frequency f_op2 for the lower load is greater than the resonant frequency f_res2, so that in either condition soft-switching can be obtained.

The controller 104 will typically have a minimum operating frequency setting, f_min. Again by reference to FIG. 2, the minimum operating frequency f_min is designed to be less than the steady state frequency f_op2 to guarantee normal operation for the low impedance load (curve 2).

When the driver 100 is powered on, the controller 104 will quickly sweep the operating frequency from a maximum setting toward the minimum setting f_min to provide the target current set by the reference I_ref. However, the control loop in the controller has an inherent delay, especially for proportional-integral (PI) implementations. Accordingly, the controller will typically sweep the operating frequency all the way down to the minimum frequency f_min, and then back up to the steady-state frequency f_op. In the case of a higher impedance load, the resonant tank will therefore go through capacitive mode switching because f_min<f_res1. This could be a very harmful operating condition if there is no hardware protection circuit employed to avoid capacitive mode switching.

Capacitive mode protection circuitry is known in the art as a supplement to avoid capacitive mode switching, but such circuitry is typically costly, and may increase the product cost to an unacceptable level. Therefore, it would be desirable to implement lower-cost solutions including software control algorithms to avoid this harmful capacitive mode operating.

BRIEF SUMMARY OF THE INVENTION

The aforementioned problems are effectively solved by a resonant power converter implementing a frequency control method as disclosed herein.

In a particular embodiment, a method of avoiding capacitive mode switching is provided for a resonant power converter having an operating frequency. One or more feedback signals are generated, representing respective output values of the resonant power converter. The operating frequency of the resonant power converter is regulated based at least on a value of a first feedback signal relative to a reference value. A capacitive switching mode of operation for the resonant power converter is determined by a controller based on a detected direction of change in an output value relative to a detected direction of change in the operating frequency, and the controller further sets the operating frequency to a preceding operating frequency and disables regulation of the operating frequency therefrom.

In one example for implementing a method as disclosed herein, an error signal generator may be coupled to at least a first sensing circuit in an output stage of the power converter, and configured to generate an error signal corresponding to a difference between the first feedback signal and the reference value. The controller is accordingly configured to regulate the operating frequency based on the error signal.

In one exemplary aspect, the error signal generator may further be coupled to a dimming interface, and the reference value adjustably defined based on an input from the dimming interface.

In another exemplary aspect, the circuitry for implementing the frequency control method may be designed to drive a 210 W LED lighting device.

In another aspect, the power converter may be designed to be a constant output power type, with adjustable output current and voltage capability. For example, the design may accommodate a wide range of output voltage and current, such as 1.4 A, 150V to 0.7 A, 300V.

In another aspect, the controller may be designed to use either of the output current direction of change with respect to frequency, or the output voltage direction of change with respect to frequency, as an indicator for capacitive mode switching.

The controller may in certain embodiments dynamically record a minimum frequency when it senses capacitive mode switching for the first time, e.g., when $$\frac{\Delta V_{out}}{\Delta f} > 0,$$

and further return thereto for subsequent determinations of capacitive mode switching.

DETAILED DESCRIPTION OF THE INVENTION

Figure 3:
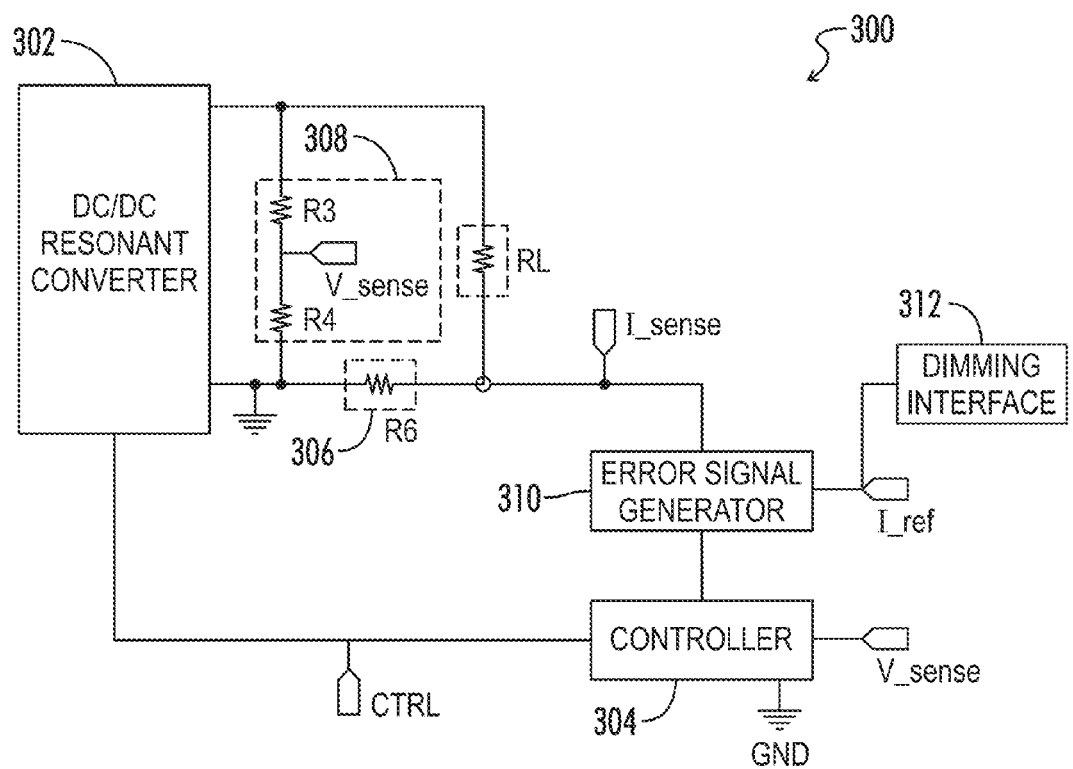
FIG. 3 is a circuit block diagram representing an exemplary power converter as disclosed herein.
Figure 4:
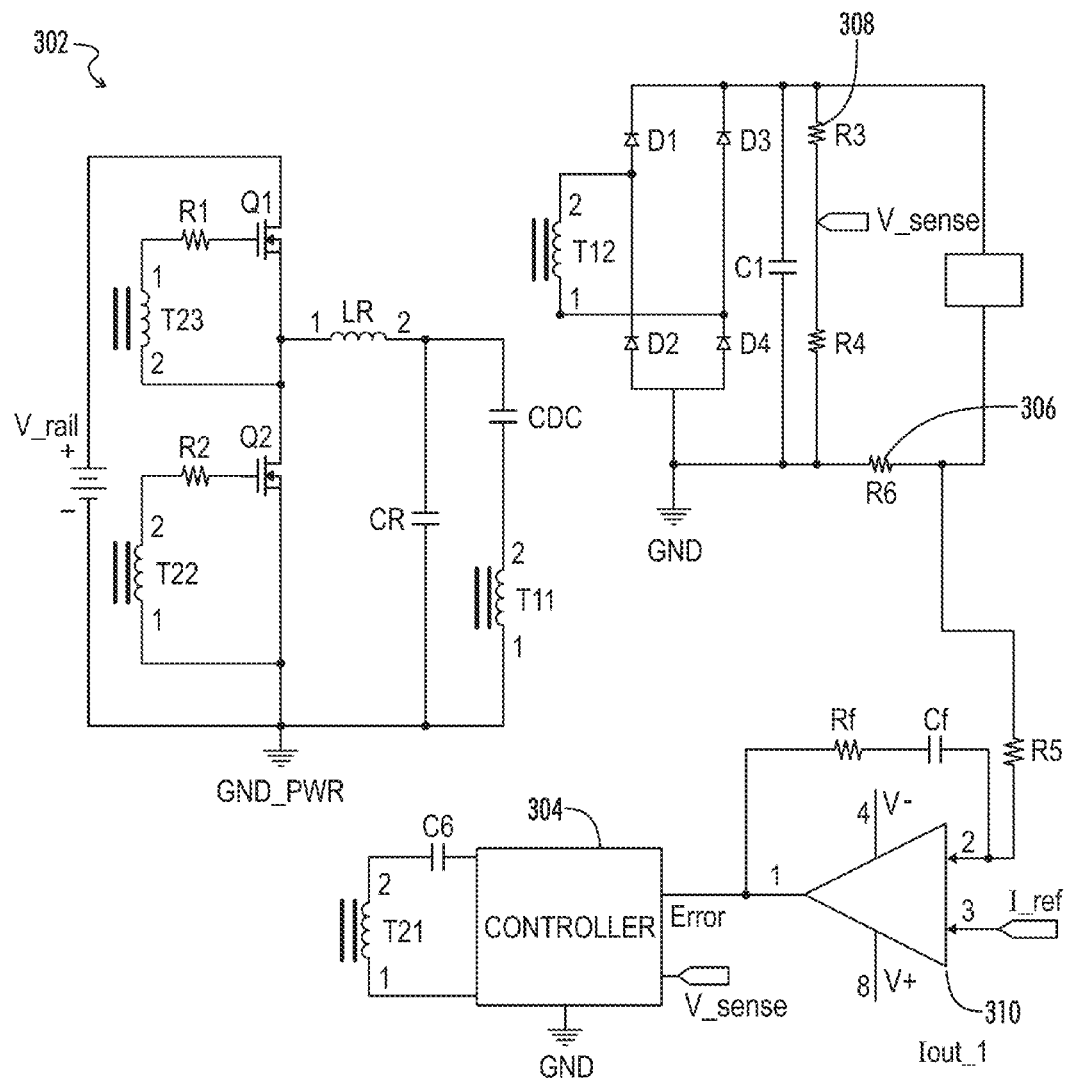
FIG. 4 is a circuit block diagram representing a particular exemplary embodiment of the power converter of FIG. 3.
Figure 5:
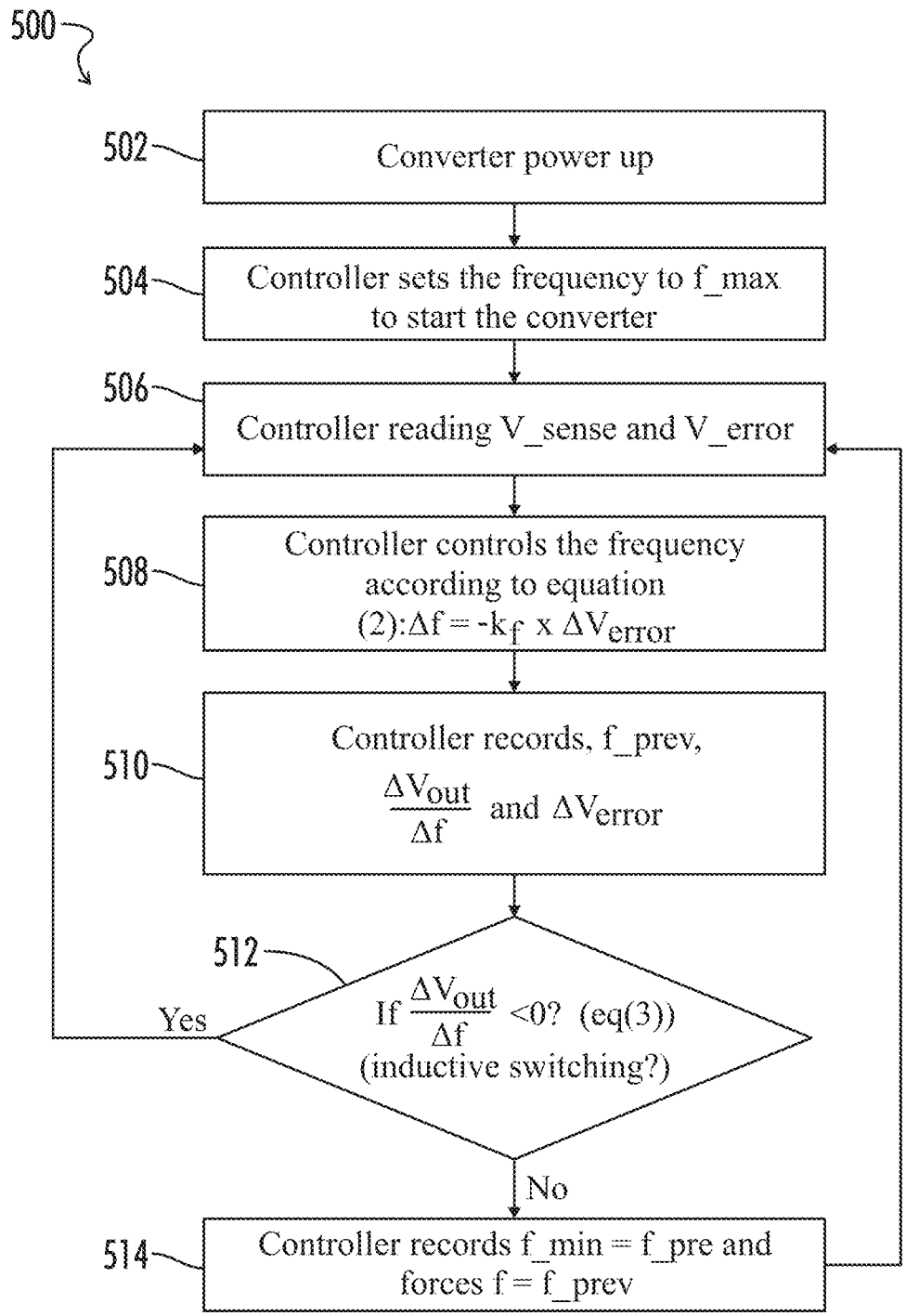
FIG. 5 is a flowchart representing an exemplary frequency control method as disclosed herein.

Referring generally to FIGS. 3-5, various exemplary embodiments of an invention may now be described in detail. Where the various figures may describe embodiments sharing various common elements and features with other embodiments, similar elements and features are given the same reference numerals and redundant description thereof may be omitted below.

With reference to FIG. 3, a power converter 300 as disclosed herein includes a DC-DC resonant-type converter 302 having a voltage sensing circuit 308 added across an output therefrom, and in parallel with a series circuit including the lighting load RL and the current sensing circuit 306. The voltage sensing circuit 308 may be implemented using resistors R3 and R4 as a voltage divider with the reference taken from a node there between. The voltage across the resistor R4 will provide the output voltage information V_sense, which will be fed back to a controller 304.

Figure 1:
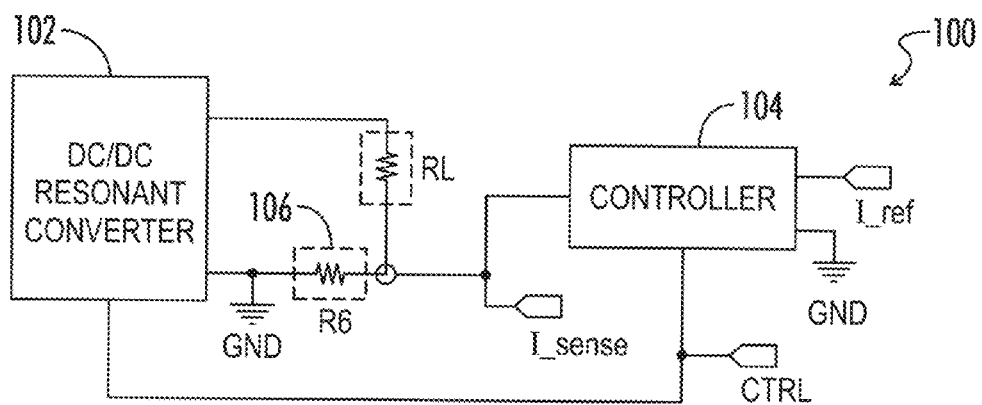
FIG. 1 is a circuit block diagram representing a power converter as conventionally known in the art.

A current sensing signal I_sense, as otherwise may be equivalent to that previously disclosed with respect to the circuit of FIG. 1, is fed back to an error signal generator 310 for PI (proportional and integration) control.

An exemplary circuit topology for the DC-DC resonant converter stage 302 may be described with reference to FIG. 4. A DC source V_rail may be provided from, e.g., a power factor correction (PFC) circuit, and represents the DC voltage input for a half-bridge resonant tank. Half-bridge switching elements Q1 and Q2 are coupled across the DC source, with gate drive resistors R1 and R2 respectively coupled in series with winding T23 and T22 as auxiliary windings of a gate driver transformer T2. The main resonant tank contains a main resonant inductor Lres and a main resonant capacitor Cres, a DC-blocking capacitor CDC and a primary winding T11 of an isolating output transformer.

The secondary winding T12 of the output transformer provides the input of a full-wave rectifier diode bridge D1, D2, D3, D4. The AC voltage from the output transformer T12 is then rectified by diode bridge to a DC voltage. A high frequency filtering capacitor C1 is coupled across an output of the diode bridge.

An exemplary embodiment of the aforementioned error signal generator 310, as provided in FIG. 4, may include an operational amplifier U1A coupled to receive the output current feedback I_sense via resistor R5 at a first input terminal, and to receive the current reference I_ref at a second input terminal.

The transfer function of the PI loop may be defined as:

$$\Delta V_{error} = (V_{ref} - V_{I\_sense}) \cdot \left( \frac{R_f}{R_5} + \frac{1}{sR_5C_f} \right) \quad \text{(Eq. 1)}$$

The controller 304 senses an error signal provided from the error signal generator 310 to control the frequency according to the following equation, wherein Kf is the gain of frequency change based on error change:

$$\Delta f = -k_f \Delta V\_error \cdot k\_v\_out \quad \text{(Eq. 2)}$$

As shown in (Eq. 1), when the reference current signal V_ref is greater than the actual current signal, V_I_sense, the error change of the PI loop is positive. As a result, according to (Eq. 2) the frequency change is negative, which means that if the output current is less than the target I_ref, the controller will reduce the frequency to compensate.

An embodiment of a frequency control technique 500 as disclosed herein may further be described with reference to FIG. 5. When the device is powered on (step 502), the initial output current is zero and the error change signal is positive. The controller will accordingly set the frequency to a maximum frequency f_max to start the converter (step 504) and then sweep down the frequency in an effort to achieve the current set by reference (i.e., or until the error change signal is 0). However, as previously noted the PI control loop has an inherent delay due to the integration component in (Eq. 1). The controller will sweep down the frequency to less than the normal operating frequency, and ultimately to its internal minimum frequency. This would otherwise cause capacitive mode switching problems for high impedance loads, since the f_res1>f_min.

Figure 2:
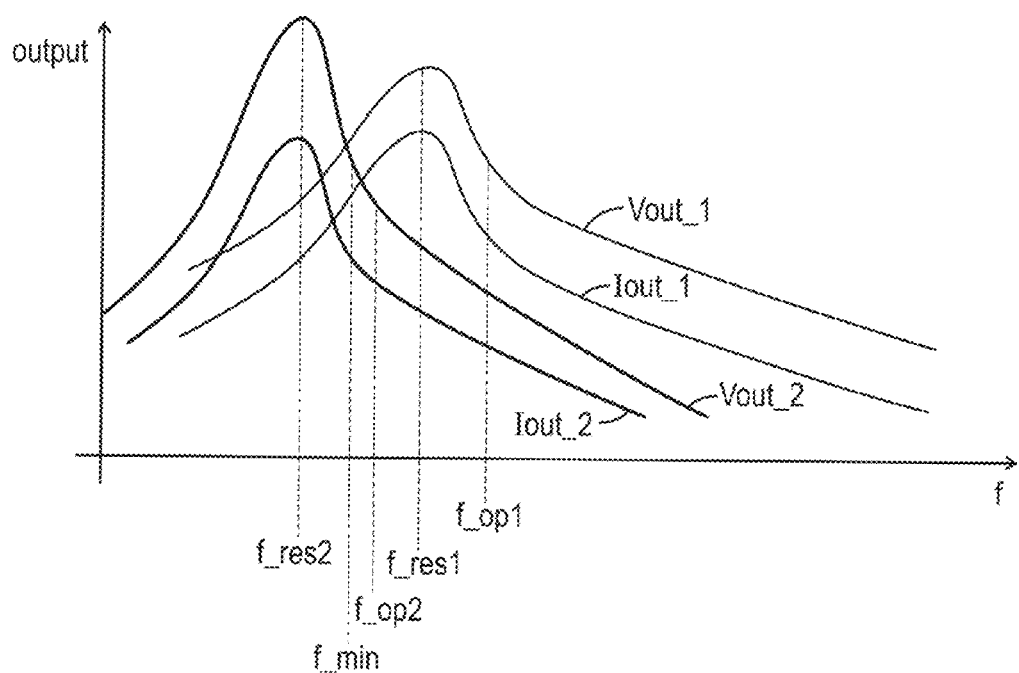
FIG. 2 is a graphical diagram representing exemplary output gain curves with respect to frequency.

However, the solution as disclosed herein prevents this from to happening, as the controller is configured to determine whether or not the tank reaches capacitive mode switching. Referring back to FIG. 2, we can see that when the frequency decreases, the output voltage will increase until it reaches the resonant frequency, e.g., f_res1. Beyond the resonant frequency f_res1, the voltage V_out1 will decrease as the operating frequency further decreases. The direction of change in the output voltage with respect to corresponding change in frequency may therefore be a real time indicator for capacitive mode switching.

The controller reads the actual output voltage from the voltage sensor V-sense and also the error signal V_error from the error signal generator (step 506). A capacitive mode switching indicator as disclosed herein may be implemented, wherein we modify the frequency control equation (Eq. 2) as follows:

$$\Delta f = -k_f \cdot \Delta V\_error \cdot k\_v\_out \quad \text{(Eq. 3)}$$

According to (Eq. 3), k_v_out=1 when $$\frac{\Delta V_{out}}{\Delta f} < 0,$$

and k_v_out=0 when $$\frac{\Delta V_{out}}{\Delta f} > 0.$$

As the controller adjusts the operating frequency over time, it may further be configured to continuously (or an equivalent thereof) record values for parameters such as for example a previous operating frequency f_prev, the error signal ΔV_error, and/or the change in the output voltage change with respect to the change in frequency, ΔV_out/Δf (step 510).

When the change in the output voltage change with respect to the change in frequency, ΔV_out/Δf, is negative (or "yes" as determined by the controller in step 512), it means that tank is operating to the right hand side of the resonant frequency, f_res, and the operating condition is inductive mode (soft-switching). The controller in this mode will continue controlling the frequency as it has been, or in other words for as long as k_v_out=1, and return to step 506.

When the change in the output voltage with respect to the change in frequency, $$\frac{\Delta V_{out}}{\Delta f},$$

becomes positive (or "no" as determined by the controller in step 512), it means that tank is operating to the left hand side of the resonant frequency, f_res, and the operating condition is capacitive mode (hard-switching). The controller in various embodiments may be configured to continuously monitor the relevant variables in order to identify this capacitive mode in real time, and subsequently to disable changes in the operating frequency, wherein k_v_out=0.

When the change in the output voltage with respect to the change in frequency, $$\frac{\Delta V_{out}}{\Delta f},$$

initially becomes positive, the controller may be further configured to reset the minimum frequency to the previous operating frequency, f_min=f_prev, and force the operating frequency to be f=f_prev in order to allow the PI control loop to settle down (step 514). The process then returns to step 506 wherein the controller continues to monitor operating variables.

In other words, in accordance with the aforementioned technique, as soon as the controller senses that the tank has entered into capacitive mode, it will go back to the previous operating frequency and restore inductive mode switching. By doing this, we can effectively avoid entering into capacitive mode switching and protect the half-bridge switches from being damaged.

In an embodiment, the capacitive mode switching indicator may alternatively be the direction of change in current with respect to the change in frequency (instead of the direction of change in voltage with respect to frequency as shown in (Eq. 3)), wherein:

$$\Delta f = -k_f \cdot \Delta V\_error \cdot k\_I\_out \quad \text{(Eq. 4)}$$

Following (Eq. 4) in similar fashion as with (Eq. 3), above, k_I_out=1 when ΔIout/Δf<0, and k_I_out=0 when ΔIout/Δf>0. The controller can also sense real time current instead of output voltage to know if the resonant converter tank is still in soft-switching mode or not, using a control technique which is otherwise as the same as described above with respect to FIG. 5.

In various embodiments, a resonant power converter as disclosed herein is contemplated for use in an LED driver circuit or other circuit for providing power (e.g., current) from a power source to a light source. A "light source" as used herein may generally refer to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. It may further be contemplated that loads other than light sources may be used with the driver circuit, and the driver circuit may be used, e.g., in a light fixture with an associated housing, without a housing or in a housing other than a light fixture housing.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method of avoiding capacitive switching in a resonant power converter having an operating frequency, the method comprising:
    generating one or more feedback signals representing respective output values of the resonant power converter;
    regulating the operating frequency of the resonant power converter based at least on a value of a first feedback signal relative to a reference value;
    determining a capacitive switching mode of operation for the resonant power converter based on a detected direction of change in an output value relative to a detected direction of change in the operating frequency; and
    setting the operating frequency to a preceding operating frequency and disabling regulation of the operating frequency therefrom.

2. The method of claim 1, further comprising continuously recording a current operating frequency of the resonant power converter,
    wherein setting the operating frequency to a preceding operating frequency comprises:
    setting the current operating frequency to an immediately preceding recorded operating frequency.

3. The method of claim 1, wherein the first feedback signal represents an output current value.

4. The method of claim 3, wherein a second feedback signal is provided representative of an output voltage value, and the capacitive mode of operation is determined based on a detected direction of change in the output voltage value relative to a detected direction of change in the operating frequency.

5. The method of claim 4, further comprising enabling regulation of the operating frequency upon determining a negative relation between a detected direction of change in the output voltage value relative to a detected direction of change in the operating frequency.

6. The method of claim 5, wherein a capacitive switching mode of operation or an inductive mode of operation is continuously determined based on a positive relation or a negative relation, respectively, between a detected direction of change in the output voltage value relative to a detected direction of change in the operating frequency.

7. The method of claim 1, wherein the step of regulating the operating frequency of the resonant power converter based at least on a value of a first feedback signal relative to a reference value comprises:
    generating an error signal corresponding to a difference between the first feedback signal and the reference value, and
    regulating the operating frequency based on the error signal.

8. The method of claim 7, wherein the reference value is adjustably defined based on an input from a dimming interface.

9. A resonant power converter, comprising:
    first and second switching elements coupled across a DC source and configured for switching at an operating frequency in accordance with gate drive signals from a controller;
    a resonant circuit coupled between an isolation transformer primary winding and an output node between the first and second switching elements;
    an output stage coupled to a secondary winding of the isolation transformer and having one or more sensing circuits configured to provide at least a first feedback signal representative of one or more output values for the output stage; and
    the controller configured to
        regulate the operating frequency of the first and second switching elements based at least on the output value associated with the first feedback signal relative to a reference value,
        determine a capacitive switching mode of operation for the resonant power converter based on a detected direction of change in an output value relative to a detected direction of change in the operating frequency; and
        set the operating frequency to a preceding operating frequency and disable regulation of the operating frequency therefrom.

10. The power converter of claim 9, further comprising an error signal generator coupled to at least a first sensing circuit in the output stage, and configured to generate an error signal corresponding to a difference between the first feedback signal and the reference value, wherein the controller is configured to regulate the operating frequency based on the error signal.

11. The power converter of claim 10, wherein the error signal generator is further coupled to a dimming interface, and the reference value is adjustably defined based on an input from the dimming interface.

12. The power converter of claim 9, wherein the controller is further configured to continuously record a current operating frequency of the first and second switching elements, wherein setting the operating frequency to a preceding operating frequency comprises setting the current operating frequency to an immediately preceding recorded operating frequency.

13. The power converter of claim 9, wherein the first feedback signal represents an output current value provided via a current sensor.

14. The power converter of claim 13, wherein a voltage divider is coupled across first and second output terminals and is configured to provide a second feedback signal that is representative of an output voltage value, and the capacitive switching mode of operation is determined based on a detected direction of change in the output voltage value relative to a detected direction of change in the operating frequency.

15. The power converter of claim 14, wherein the controller is further configured to enable regulation of the operating frequency upon determining a negative relation between a detected direction of change in the output voltage value relative to a detected direction of change in the operating frequency.

16. The power converter of claim 15, wherein a capacitive switching mode of operation or an inductive switching mode of operation is continuously determined based on a positive relation or a negative relation, respectively, between a detected direction of change in the output voltage value relative to a detected direction of change in the operating frequency.

* * * * *